United States Patent
Berger et al.

(10) Patent No.: US 12,269,114 B2
(45) Date of Patent: Apr. 8, 2025

(54) AUTOMATIC DETERMINATION OF A DYNAMIC LASER BEAM SHAPE FOR A LASER CUTTING MACHINE

(71) Applicant: BYSTRONIC LASER AG, Niederönz (CH)

(72) Inventors: Michael Berger, Bern (CH); Titus Haas, Zofingen (CH); Simon Scheidiger, Langenthal (CH)

(73) Assignee: BYSTRONIC LASER AG, Niederönz (CH)

( * ) Notice: Subject to any disclaimer, the term of this patent is extended or adjusted under 35 U.S.C. 154(b) by 0 days.

(21) Appl. No.: 18/701,048

(22) PCT Filed: Oct. 24, 2022

(86) PCT No.: PCT/EP2022/079623
§ 371 (c)(1),
(2) Date: Apr. 12, 2024

(87) PCT Pub. No.: WO2023/072846
PCT Pub. Date: May 4, 2023

(65) Prior Publication Data
US 2024/0326160 A1    Oct. 3, 2024

(30) Foreign Application Priority Data
Oct. 25, 2021  (EP) ..................................... 21204460

(51) Int. Cl.
*B23K 26/06* (2014.01)
*B23K 26/38* (2014.01)
(Continued)

(52) U.S. Cl.
CPC .......... *B23K 26/0604* (2013.01); *B23K 26/38* (2013.01); *B23K 31/006* (2013.01); *B23K 31/10* (2013.01)

(58) Field of Classification Search
CPC .. B23K 26/0604; B23K 31/006; B23K 26/38; B23K 31/10
(Continued)

(56) References Cited

U.S. PATENT DOCUMENTS 5,856,649 A * 1/1999 Yamazaki .......... B23K 26/0853
                                                    700/166
5,925,271 A * 7/1999 Pollack .................... C21D 1/09
                                                    219/121.85
(Continued)

FOREIGN PATENT DOCUMENTS

WO    2019/145536 A1    8/2019

OTHER PUBLICATIONS

International Search Report and Written Opinion, mailed Jan. 30, 2023, from PCT/EP2022/079623, 10 pages.
(Continued)

*Primary Examiner* — Jimmy Chou
(74) *Attorney, Agent, or Firm* — Workman Nydegger

(57) ABSTRACT

A control unit for determining a dynamic laser beam shape for controlling a laser cutting machine, which is provided with a dynamic beam shaping module for varying the shape of the laser beam. The control unit includes a cutting plan interface, which is configured for receiving a cutting plan, an interface to a shape storage with a stored set of dynamic laser beam shapes, in particular more than two, and a processor which is configured for automatically calculating for each of the cutting segments an allocation to a dynamic laser beam shape of the set of dynamic laser beam shapes, wherein calculating the allocation is based on the property indicator of the workpiece and is specific for the respective cutting segment. The processor is further configured for providing control instructions for controlling the laser cut-
(Continued)

ting machine by applying the determined dynamic laser beams shapes for each cutting segment specifically.

13 Claims, 5 Drawing Sheets

(51) Int. Cl.
*B23K 31/00* (2006.01)
*B23K 31/10* (2006.01)

(58) Field of Classification Search
USPC .................................................. 219/121.61
See application file for complete search history.

(56) References Cited

U.S. PATENT DOCUMENTS

| | | | | | |
|---|---|---|---|---|---|
| 7,173,212 | B1* | 2/2007 | Semak | ............... | B23K 26/0604 |
| | | | | | 219/121.61 |
| 8,198,564 | B2* | 6/2012 | Unrath | ................. | B23K 26/066 |
| | | | | | 219/121.61 |
| 11,167,377 | B2* | 11/2021 | Mochizuki | ............. | B23K 26/36 |
| 11,780,027 | B2* | 10/2023 | Stewart | ................. | B23K 26/03 |
| | | | | | 219/121.76 |
| 2010/0059490 | A1* | 3/2010 | Unrath | ................. | B23K 26/705 |
| | | | | | 219/121.73 |
| 2015/0001195 | A1* | 1/2015 | Okada | .................... | B23K 26/38 |
| | | | | | 219/121.84 |
| 2015/0251267 | A1* | 9/2015 | Winn | ..................... | B23K 10/00 |
| | | | | | 83/76.1 |
| 2015/0375337 | A1* | 12/2015 | Hayashi | ................. | B23K 26/38 |
| | | | | | 219/121.61 |
| 2016/0008920 | A1* | 1/2016 | Goya | ..................... | B23K 26/36 |
| | | | | | 219/121.61 |
| 2016/0059358 | A1* | 3/2016 | Ootsu | .................. | B23K 26/702 |
| | | | | | 219/121.72 |
| 2019/0111516 | A1* | 4/2019 | Meyer | ................ | B23K 26/0861 |
| 2020/0301403 | A1* | 9/2020 | Izumi | ................ | B23K 26/0665 |

OTHER PUBLICATIONS

International Preliminary Report on Patentability, mailed Oct. 16, 2023, from PCT/EP2022/079623, 17 pages.

Shekel, Eyal, "Beam Shaping in lasers for material processing Webinar", Mar. 22, 2021, Retrieved from the Internet: URL:https://www.youtube.com/watch?v=SN3qk58P310 XP055907533.

Shekel, Eyal, "Advanced Laser Welding With Dynamic Beam", Jul. 8, 2020 (Jul. 8, 2020), Retrieved from the Internet: URL:https://www.youtube.com/watch?v=LDClb_aNEnl XP055907514.

Goppold et al., "Dynamic beam shaping for thick sheet metal cutting", IWS, Lasers in Manufacturing Conference 2017.

* cited by examiner

AUTOMATIC DETERMINATION OF A DYNAMIC LASER BEAM SHAPE FOR A LASER CUTTING MACHINE

The present invention relates to laser cutting by means of a laser cutting machine, which is provided with a dynamic beam shaping module or another at least one optical module for dynamically varying the shape of the laser beam. In particular, the present invention refers to a method for determining a dynamic laser beam shape during laser cutting, a control unit and a computer program and a computer readable storage medium.

In laser cutting applications, high quality and performance are key factors amongst others.

Generally, a laser cutting process may be optimized for contrary demands, like inter alia productivity and quality. The higher the feed rate of the laser cutting head, the higher is the productivity but quality may be diminished, as the laser beam acts upon material with a certain energy distribution defined by e.g., spot size, laser beam shape and laser power. Key factor for cutting is transforming absorbed laser energy into heat, to melt material. The energy coupling is determined by many factors and interacts with cut kerf conditions for instance.

For optimizing the above-mentioned demands, in state of the art it is known to influence the beam profile by means of e.g., varying the intensity distribution, the spot size, laser beam shape, and focal position. A first option to obtain such modifications presents static beam shaping (SBS), prevailing by spatial methods. By using SBS, the laser beam is provided before treatment starts and cannot be changed anymore. A second option is to modify a laser beam having a dynamic character. In this case, properties of the laser beam may change during processing by dynamic laser beam shaping (DBS). Alternatively, some spatial modulation methods could be also performed dynamically, e.g., by adaptive optics. In this respect it is referred to "Dynamic beam shaping for thick sheet metal cutting", Cindy Goppold, Thomas Pinder, Patrick Herwig, IWS, in: Lasers in Manufacturing Conference 2017.

When using DBS, by the spatiotemporal distribution of laser energy over the material surface, a crucial challenge is addressed: sufficient kerf dimensions at a decreasing spot size to gain the obtainable laser energy. For this purpose, high laser energy of a small spot size oscillates periodically and is superimposed with the feed rate. Thus, energy is distributed around the generated cut kerf and thereby acting as an artificial bigger spot. At that, kerf width is enlarged, which procure an unimpeded melt ejection. Moreover, the distribution prevents heat accumulations, because interaction time of laser beam to material is decreased.

For applying a DBS, the laser cutting machine is equipped with a dynamic laser beam shaping module. An example embodiment with such a DBS application is described in WO 2019 145 536 A1.

From US 2010/0059490 A1 it is known to quickly modify a laser processing beam and in particular its spatial intensity profile.

It is an object of the present invention to improve the quality of the cutting result and to differentiate between different types of cutting segments when selecting or determining for appropriate dynamic laser beam shapes.

This object is achieved by the appended independent claims. Further advantageous embodiments and features are mentioned in the dependent claims and in the following description.

In an aspect the present invention relates to a computer-implemented method for determining a dynamic laser beam shape for laser cutting of workpieces by means of a laser cutting machine, comprising at least one optical module for varying the shape of the laser beam dynamically. The method may at least comprise:

Receiving a cutting plan to be processed for cutting out parts of a workpiece, wherein each part is defined by a cutting contour, consisting of a set of cutting segments, wherein each workpiece (to be cut) is characterized by a property indicator, selected from the group consisting of a material indicator and/or a thickness indicator;

Providing a shape storage with a set of dynamic laser beam shapes, in particular more than two dynamic laser beam shapes;

By a processor: Automatically calculating for each of the cutting segments iteratively for all parts to be cut out of the workpiece an allocation to a dynamic laser beam shape of the set of dynamic laser beam shapes, which are stored and have been accessed in the shape storage, wherein calculating the allocation is based on or takes into account or considers the property indicator of the workpiece and wherein calculating the allocation is specific for the respective cutting segment;

By the processor: Providing control instructions for controlling the laser cutting machine for executing the received cutting plan by applying the determined dynamic laser beams shapes for each cutting segment specifically.

Generally, the laser cutting machine may comprise more than one optical model, which assist in or cause varying the laser beam dynamically. For example, two (2) galvo scanner mirrors, one for movement in X and one in Y may be used. Alternatively, or in addition, 3D beam shaping may be achieved by means of a 2-axis module for X/Y variation and/or a Z-wobbling module for movement in the direction of the beam axis. Alternatively, or in addition, a CIVAN laser system may be used for shaping the beam by interconnection of e.g., 32 single optical modules.

The allocation is segment specific. Different dynamic laser beam shapes will be allocated to different types of segments (e.g. straight line, curve). In particular, segments which are to be cut with different speed are subject for different processing, in particular different dynamic laser beam shapes are allocated to such different segments, which are cut with different speed. Typically, the dynamic laser beam shape is allocated to a (certain) segment and not vice versa, as the segment is fixed according to the geometry, defined in the cutting plan.

In a preferred embodiment, the method may further comprise an intermediate verification step. After the allocation (segment—dynamic laser beam shape) has been calculated by the processor, in particular algorithmically (allocation algorithm), this allocation may be provided on a user interface for the purpose of verification. In case a verification signal is detected the allocation may be applied. Otherwise, a correction procedure may be initiated. The correction procedure may be executed online (e.g., during the cutting procedure) or offline (e.g., independent of and/or not during the cutting procedure) by means of an algorithm and may be configured to calculate deviating allocations. For example, it is possible that the user manually chooses a different allocation (e.g., another dynamic laser beam shape for the specific segment). Alternatively, a different allocation may be suggested algorithmically, by e.g., taking into account historic data of other allocations or statistical evaluations (e.g. mean value).

In a preferred embodiment of the present invention, the type of cutting segments is selected from the group, comprising:
- Straight line;
- Circle or circle segments with a configurable particular radius;
- Corner with a configurable angle,
- Parameterized curve;
- Pierce-in;
- Lead-in;
- Lead-out and/or
- Engraving.

In another preferred embodiment of the present invention, the step of (automatically) calculating the allocations is executed by a trained model, in particular a neural network model, which provides for a specific segment as input a specific dynamic laser beam shape as output.

In another preferred embodiment of the present invention, the model is trained with training data, consisting of:
- A selected dynamic laser beam shape used for a test cut;
- The property indicator (type of material and/or material thickness) of the workpiece which was test cut;
- A type of cutting segment, which was test cut;
- A selected dynamic beam shape for the test cut segment with an assessment dataset, in particular a quality assessment or another assessment (which will be explained more detailed below), serving as annotated data label.

Preferably, the model is trained by executing the following steps:
- Preselecting a dynamic laser beam shape of the set of dynamic laser beam shapes;
- Executing cutting segment-specific test cuts with the preselected dynamic laser beam shape;
- Executing an assessment of a result of the test cuts by providing assessment datasets for each test cut;
- Tuning the weights of the model such as an objective function for the assessment dataset is optimized.

The model has been trained to assign a specific dynamic laser beam shape to a specific type of segment. The learning or training algorithm is configured to find the "best" assignment or assignment based on the "best" assessment automatically. The training algorithm may be based on an assessment dataset.

The assessment may be a quality assessment, a performance assessment, an energy consumption assessment, a process stability assessment, a burr height assessment, a roughness assessment, a feed rate assessment, a kerf width assessment, a gas consumption assessment, a contour error assessment, an inclination angle/rectangularity assessment, a flatness cut edge assessment, a heat affected zone assessment. With respect to the process stability assessment, an example is given as follows: it is possible to have a setting which results in very good quality but the setting is not stable and a small change of the system and/or material will lead to worse quality. Therefore, in a preferred embodiment, process stability is considered in the assessment and assessment dataset. In a preferred embodiment of the present invention, more than one type of assessment is carried out and a combination of different assessments is provided, for example a quality assessment and a performance assessment and energy consumption assessment.

Generally, the assessment may be executed automatically by the machine or by software by means of by a sensory automatic assessment unit. The sensory automatic assessment unit may comprise an in-process optical system, in particular camera and/or diodes. The optical system may be attached at the cutting head, directed to the processing zone on the processed workpiece.

Alternatively, or in addition, the assessment may be executed manually by means of user input, received on a human machine interface. The assessment dataset may comprise manually or automatically setting a configurable share of different assessment criteria in common, comprising a quality assessment, a performance assessment, and/or a process stability assessment and/or other assessments, as mentioned above. As the different assessment criteria have interdependencies, they may be tuned on a user interface selection button, provided on a human machine interface, HMI, in case of a manual setting the configurable share of the different assessment criteria.

Also, both of the above-mentioned options (manual or automatic assessment) may be combined, so that both modes may be used as a verification step. First, automatic assessment is provided and output on the human machine interface which, second, may be verified by the user. The user may accept or deny the automatic assessment and, in case of denial, may provide user input signals, representing of manual assessment.

According to a preferred embodiment, the automatically determined dynamic laser beam shapes for each of the cutting segments are determined specifically for a certain type of cutting machine. The type of cutting machine comprises inertia indicators (for instance of the laser cutting head and the respective actors for moving the laser cutting head), size indicators of the laser cutting machine, and/or at the machine properties.

According to another preferred embodiment, in the set of (different) dynamic laser beam shapes the dynamic laser beam shape is dynamically varied by generating focal point oscillation shapes through spatiotemporal distribution of laser energy over a material surface and/or a focal plane with respect to:
- a frequency in X and Y and preferably in X and Y and Z direction;
- an amplitude in X and Y and preferably in X and Y and Z direction; and/or
- a phase shift in Y compared to X direction, preferably in Y and Z compared to X direction.

Alternatively or in addition the dynamic laser beam shape is varied by oscillations of the focal point in X and Y direction (with respect to frequency and/or amplitude), which may be combined with a wobbling (in Z direction) with the laser beam diameter change.

Alternatively or in addition contour errors may be determined (estimated and/or measured) and these determined contour errors are compensated. Compensating the contour errors may be executed by means of an amended calculation of the allocation. Measuring the contour errors may be executed by means of a, e.g. coaxial, camera.

The contour deviation is known due to the previous measurement in X and Y direction ($c_{x(t)}$, $c_y(t)$) for each position or time step.

At least two methods exist to compensate the contour errors (Offset, DBS Amplitude).

Method Offset:

This contour error values are used as offset values for the dynamic laser beam shape. Since the contour errors varies over the part/time, each position/time step has a different offset value

Example

The dynamic laser beam shape is a Lissajous figure LF_1

$$LF_1 = \begin{pmatrix} x_1 = A_1 \sin(a_1 t + \phi_1) \\ y_1 = B_1 \sin(b_1 t) \end{pmatrix}$$

the contour-error-compensated-Lissajous figure is LF_2

$$LF_2 = \begin{pmatrix} x_1 - c_x(t) \\ y_1 - c_y(t) \end{pmatrix}$$

DBS Amplitude:

Instead of using an offset, the amplitude of the dynamic laser beam shape can be adapted over the part/time.

Example $$LF_3 = \begin{pmatrix} (A_1 - c_x(t))\sin(a_1 t + \phi_1) \\ (B_1 - c_y(t))\sin(b_1 t) \end{pmatrix}$$

According to another preferred embodiment, a transition zone is determined by a linear, non-linear and/or a logarithmic and/or other transition function. A transition zone may be interpreted in a spatial and/or time related sense. A transition zone may be defined as a transition between two consecutive segments of the workpiece. A transition zone, e.g., may be a zone between a curved segment and a straight line segment and between a straight line segment and another type of segment. The dividing of the workpiece contour to be cut in segments may be defined according to the cutting plan.

According to another preferred embodiment, the allocation of a type of dynamic laser beam shape to a particular type of cutting segment is dependent on a predicted contour error within the segment, wherein the predicted contour error is provided by a contour prediction algorithm. The contour prediction algorithm considers the inertia of the laser cutting head. In case, an "overshoot" (movement, deviating from the target contour based on interia) is suspected, which could lead to contour infidelity or incorrectness, this could be counteracted by adjusting the dynamic beam shaping module, accordingly.

According to another preferred embodiment, the (dynamic) laser beam shapes are implemented as Lissajous shapes. A set of Lissajous figures may be stored in a shape storage. As an advantage of providing a particular shape storage which may be accessed independently, the set of shapes may be amended and extended continuously and even during application of the method for determining a dynamic laser beam shape.

According to another preferred embodiment, the method comprises to receive cutting requirements via a user interface, selected from the group consisting of burr height, roughness, feed-rate, kerf width, energy consumption, gas consumption, process stability, contour error, inclination angle/rectangularity, flatness of cutting edge, and/or heat affected zone. The control instructions are generated by taking into account the received cutting requirements.

According to another preferred embodiment, the (dynamic) laser beam shapes are determined based on user input data. User input data may be or may comprise quality requirements, material requirements and/or other process conditions. Generally, the step of allocating is executed automatically. However, also a semi-automatic mode may be applied in another preferred embodiment of the invention for verifying the automatic allocation. In this case, the system makes a computer-generated (automatic) suggestion for e.g., one Lissajous figure per segment and this is displayed to the user, who can verify the automatic decision or can "overrule" this suggestion and can select another figure or shape manually.

According to another preferred embodiment, each of the dynamic laser beam shapes comprises a geometrical dataset, indicating the geometrical form and/or a time-related dataset, indicating how the geometrical form has to be executed, in particular indicating a velocity and/or acceleration and/or jerk.

Alternatively or in addition, calculating the allocation is based on or considers the geometrical data set and/or the time-related dataset. Considering the above mentioned aspects may improve efficiency by providing a preselection of allocation candidates so that the (final) calculation may be executed on a smaller dataset.

Alternatively or in addition, calculating the allocation is executed in a cutting speed dependent manner. This may improve quality and may prevent high speed differences between consecutive cutting segments.

Up to now, the invention has been described with respect to the claimed method. Features, advantages or alternative embodiments herein can be assigned to the other claimed objects (e.g., the computer program or the control unit) and vice versa. In other words, the apparatus or device can be improved with features described or claimed in the context of the method and vice versa. In this case, the functional features of the method are embodied by structural units of the apparatus or device or system and vice versa, respectively. Generally, in computer science a software implementation and a corresponding hardware implementation (e.g., as an embedded system) are equivalent. Thus, for example, a method step for "receiving" data (e.g., a cutting plan) may be performed with an interface and respective instructions to receive data. For the sake of avoiding redundancy, although the device may also be used in the alternative embodiments described with reference to the method, these embodiments are not explicitly described again for the device.

According to another aspect the present invention relates to a control unit which is configured for executing the method as described above for determining a dynamic laser beam shape for controlling a laser cutting machine, which is provided with at least one optical module (in particular a dynamic beam shaping module) for varying the shape of the laser beam, with:

A cutting plan interface, which is configured for receiving a cutting plan to be processed for cutting out parts of a workpiece, wherein each part is defined by a cutting contour, wherein the cutting contour consists of (or may be defined by) a set of cutting segments, wherein each workpiece is characterized by a property indicator, selected from the group consisting of a material indicator and/or a thickness indicator;

An interface to a shape storage with a stored set of (different) dynamic laser beam shapes, in particular more than two (2);

A processor which is configured for accessing the allocation storage with each of the cutting segments iteratively, for automatically allocating (or calculating an allocation) a specific dynamic laser beam shape to each of the cutting segments of the cutting contour according to the received cutting plan, wherein automatically allocating is specific for the respective cutting segment and is based on the property indicator of the workpiece; and wherein the processor is further configured for providing control instructions via or on an output interface for controlling the laser cutting machine for executing the received cutting plan by applying the determined dynamic laser beams shapes for each cutting segment specifically.

In another aspect the present invention relates to a computer program comprising a computer program code, the computer program code when executed by a processor causing the control unit to perform the steps of the method as described above.

In still another aspect the present invention relates to a computer readable storage medium in which computer program as mentioned before is stored.

In the following a definition of terms used in this application is given.

The workpiece is to be construed as the material to be cut. The workpiece may be a flat sheet like workpiece, like a sheet of metal with varying properties, or the workpiece may be a tube workpiece or other closed profiles with different cross section (rectangle or square) or open 3D-profiles, like e.g., a U- or V-shaped profile. The workpiece may be a metal workpiece. The workpiece may e.g., be a metal sheet of different type and/or having different thickness. Typically, the cutting plan defines the parts which need to be cut out of the workpiece. The parts to be cut out from the workpiece may have a particular contour, which may differ from part to part. For instance, a first set of circle parts need to be cut out completely from the workpiece and a second set of rectangle parts need to be cut out. Each part to be cut out may be defined by a cutting contour. The cutting contour may consist of a set or a number of cutting segments. For example, a rectangle part may comprise a first segment as a first straight-line segment, followed by second segment, being a corner segment (radius), followed by a third segment, being a second straight-line segment, followed by a fourth segment, being a corner segment, followed by a fifth segment, being a first straight-line segment again etc. The cutting contour defines the shape of a part from a top view.

The set of cutting segments may be ordered in a queue. The ordering is defined by the movement direction of the cutting head. The queue is an ordered list of cutting segments, which are cut one after the other.

A cutting contour may consist of a set of segments and at a minimum comprises one single segment. For example, if a circle part needs to be cut-out off a workpiece, the circle parts typically comprise one single (circle) segment. If more complex contours need to be cut, the contour may be segmented in a set of segments. For example, if a square contour needs to be cut, the square contour may be segmented in four equal straight-line segments, representing the four sides of the square and in four corner or curve segments, representing the four corners of the square.

Segmenting a contour of a part into a set of segments may be executed automatically by a segmentation algorithm. In this respect, it has to be noted, that the segmentation algorithm needs not to be construed as a "normal" segmentation algorithm in image processing, for example known from medical image processing to segment organs in anatomical body parts. The segmentation algorithm here relates to sub-dividing a two-dimensional contour into different portions or parts. In preferred very simple embodiment, the segmentation algorithm may simply access the cutting plan and may process data therein to determine the segmentation of the contour to be cut into a sequence of segments. Alternatively, or in addition, the segmentation algorithm may take into account the differences between the respective contour portions for the laser cutting process in view of inertia of the laser cutting head arrangement when being moved along the contour. Thus, the segmentation algorithm takes into account the inertia of the laser cutting head arrangement. Alternatively, or in addition, the segmentation algorithm may also take into account other laser cutting properties. For example, an energy input per unit length, an energy distribution within the workpiece and/or a dynamic capability of machine axes may be taken into account by the segmentation algorithm. The segmentation algorithm may be based on artificial intelligence (AI) in particular on a machine learning module, which has been trained to find segmentation for a contour by taking into account laser cutting machine properties (inertia, masses, velocity, speed etc.).

As already described above, straight-line portions may be cut with higher speed than corner portions. Therefore, such a contour may be segmented in straight-line segments and corner segments. Alternatively, or in addition, the step of segmenting (i.e., the segmentation) may be executed manually via user input on a human machine interface.

A cutting segment typically is provided in an ordered series or queue of cutting segments. Each cutting segment of the ordered queue of cutting segments is subject to an allocation of a specific dynamic laser beam shape.

The cutting segments are ordered such as a first cutting segment is preceding a second one, which is preceding a third one etc. The cutting segments and/or the queue of cutting segments may be defined in a cutting plan or may be calculated from data within the cutting plan. The queue is, in particular, based on a cutting direction of the laser cutting head, moving over a surface of the workpiece to be cut. A cutting segment represents different types of cuts on a geometry according to the cutting plan to be executed. A cutting segment may be e.g., a straight line, a curve with varying radii (parameterized curve), which may represent a corner, a circle or circle segment, a pierce-in, a lead-in, a lead-out, and/or an engraving.

Typically, different segments represent or are related to different types or modes of the laser cutting. Thus, a first segment may be cut with a first set of cutting parameters (e.g., a first speed), whereas a second segment may be cut with a second set of cutting parameters (e.g., a second speed of the cutting head). Speed and velocity may be interpreted within this document as referring to the same content/meaning. A segment may be a straight line, a curve with varying radii, a corner, a pierce-in, lead-in, end cut, etc. A contour may be divided or segmented into different and/or equal types of segments. Thus, the contour to be cut consists of a plurality of such equal and/or different segments. For example, if a rectangle is to be cut as contour, the following segments may be defined: 2 long straight-line segments, 2 short straight-line segments, 4 (four) 90°-corner segments. In case, a circle is to be cut, there may only be one single segment per each circle contour.

A segment is related to the contour to be cut out of the workpiece. Therefore, the segment is also (indirectly) related to the workpiece with its property indicator, i.e., the material indicator and/or thickness indicator and/or other properties of the workpiece. Accordingly, the segment is related to the property indicator (of its workpiece). Thus, e.g., a first segment of a first contour of a first workpiece may differ from the first segment of the first contour of a second workpiece. Even, a first segment of first contour of a first workpiece may differ from a first segment of a second contour of the first workpiece.

Thus, in another advantageous embodiment, the processor executes the step of automatically calculating an allocation by accessing a trained model, in particular a neural network model. The neural network may be, for example, a convolutional neural network (CNN).

The neural network has been trained to determine a dynamic laser beam shape for a particular type of segment iteratively for all cutting segments. For instance, for segment type 1 the neural network or machine learning model is trained to provide a first dynamic laser beam shape and for segment type 2, anther second dynamic laser beam shape and for segment type 3, again the first dynamic laser beam shape and so on and so forth.

The trained neural network model may be stored e.g., on a cloud-based sever, which is in data exchange with the control unit. Alternatively, or in addition, the neural network model may be stored locally on a storage of the laser machine, like a controller thereof. The (deep) machine learning algorithms are data and computation intensive and are therefore preferably computed on a graphics processing unit (GPU) or a tensor processing unit (TPU) or networks of processors. Each layer of the neural network can be computed on powerful massively parallelizable processors, especially multi-core or many-core processors. The computing unit is preferably designed as or comprises a graphics card or the other hardware modules mentioned above.

The step of automatically "calculating for each of the cutting segments iteratively for all parts to be cut out of the workpiece an allocation (segment-beam shape) to the dynamic laser beam shape of the set of dynamic beam shapes" (in the following in short "step of calculating an allocation") may be executed by means of an artificial intelligence and/or a machine learning algorithm, based on a trained model, in particular a neural network model, which provides or determines for a specific type of segment (e.g., straight line, curve with different diameters) (input) a dynamic laser beam shape (output).

Alternatively or in addition, the machine learning model is trained to recognize allocations between segment (types) and a dynamic laser beam shape, in particular without a preceding analysis of properties (or features-feature extraction), which properties/features, in particular which chemical, spatial and/or temporal properties, of the cutting segment are relevant for the determination of the dynamic laser beam shape.

The step of automatically "calculating an allocation" may be implemented by a feature-extractor-free (or feature-free) process, in particular an algorithm. Alternatively or in addition the step of automatically "calculating an allocation" may be implemented by a so-called end-to-end algorithm. "End-to-end" in this context means that the raw data, i.e., the acquired contour segments, can be used without substantial preprocessing and, in particular, without manual determination of the features in the cutting segments and its processing, which are subsequently further processed (e.g., classified) to a result using a machine learning algorithm (also referred to as ML algorithm for short in the following). "Without significant preprocessing" in this context means apart from marginal preprocessing, such as histogram equalization, image depth reduction and/or region of interest (ROI) cropping.

In particular, the end-to-end algorithm or approach does not require separate preprocessing of the raw data to extract the 'features' that are important for learning. In contrast to the classical ML approach with preceding feature extraction, in a possible solution presented here not only the classificator is trained by an algorithm, but preferably also the feature extractor in the same step. This means that the algorithm independently calculates or learns representations from the input data (cutting segments) and thus also the "features". To recognize this relationship, the algorithm must independently find the best representation of the input data in order to classify it. The fact that no characteristic values ('features') have to be extracted in a preferred embodiment of the invention is advantageous in several ways. First, the effort of algorithm development can be simplified, since the important features do not have to be detected, not determined, and not extracted. Further it is advantageous that with the "feature-free" algorithm (end-to-end algorithm) development the danger does not exist that most important features, which would contain the most information, can be overlooked. In the end, the essential information is often also contained in very complex, superimposed or hardly graspable signal, image or representation of the cutting sequence features, which makes an optimal feature analysis difficult. Therefore, it is not surprising that the deep learning approach without any feature extraction implemented here is superior to feature extractor-based approaches.

The neural network may have been trained with a training algorithm based on annotated or partially annotated training data, which comprise an assessment of the cutting result with the applied dynamic laser beam shape to the respective segment. The training algorithm may be a supervised learning method or a semi-supervised learning method. The training algorithm may be based on historical data. Reinforcement learning methods can also be used to update or adapt the models. Reinforcement learning makes it possible to find solutions to this complex problem without initial data and (prior) knowledge about the laser cutting process and the transition phases. In addition, reinforcement learning eliminates the need for time-consuming collection and processing of training data.

In order to map the dynamic laser beam shape to a certain segment type within the sequence of cutting segments, a CNN or a deep neural network (DNN) in this case can be applied to learn time-dependent features. So-called gated recurrent units (GRU) or long short-term memory networks (LSTM) in particular can be applied in combination with the CNN.

The laser cutting machine is configured for applying a laser beam on a workpiece for thermal separation of workpiece material by laser radiation. The workpiece may be a tube workpiece or a flat, sheet-like workpiece with a cutting length of up to 12 meters and a width of 2 to 3 meters. The laser cutting machine may be configured for 3D metal sheets, like bended, casted or "printed" (additive manufacturing) or welded parts.

The laser cutting machine is equipped with at least one optical module. The optical module may be implemented as a dynamic beam shaping module. Alternatively, or in addition, the optical module may comprise a mirror-based system for varying the laser beam shape dynamically during cutting and thus during the movement of the laser cutting head over the workpiece according to the cutting plan and/or the cutting contour to be cut.

As mentioned before, the optical module may be implemented as a dynamic laser beam shaping module. It may comprise e.g., a laser scanner optics (e.g., as described in WO2019145536A1) or a lens-optics which is actuated or oscillated in x and y directions perpendicular to the laser beam axis (as e.g., described in WO 2019/145536 A1). The technical purpose of the dynamic laser beam shaping (module), DBSM, is quality and/or performance improvement. In a certain aspect, the DBSM may be used to provide the energy on a bigger area on the workpiece. In particular, for a wider cut kerf width (which makes subsequent automation/sorting of parts easier) a higher amplitude of the dynamic laser beam shape and/or a different focal position to enlarge the spot size may be selected and used. Further, DBSM serves for providing less damage of material properties because of lower interaction time with high power laser (less heat accumulation), which is a major improvement. With respect to quality improvement: Amongst standard cutting parameters (focal position, laser power, gas pressure, . . . ) using additionally dynamic laser beam shapes allows, choosing the cutting and dynamic laser beam shaping parameters accordingly, to reach better quality and/or performance with higher dimensions of parameter space. Moreover, overall quality (also in corners and at transitions) and/or performance may be improved, due to the ability to change the dynamic laser beam shape, no compromise settings are demanded for straight lines and corners.

It is preferred to adapt the dynamic laser beam shape during transition phases (e.g., cutting speed dependent or velocity dependent). The dynamic beam shaping may be applied with different beam shaping frequencies. The beam shaping frequencies may be in the range between 100 Hz and one or more Mega Hz and preferably in the range between 100 Hz and 900 KHz or between 100 Hz and several hundred Kilo Hz. Preferably, the beam shaping frequency may be varied in each of the above-mentioned directions, i.e., in X and Y and even in Z direction. It has to be pointed out that in a preferred embodiment, the beam shaping frequencies may be set differently in each of these directions, so that e.g., in X direction a first beam shaping frequency of e.g., 200 Hz may be applied and in Y direction a second beam shaping frequency of e.g., 900 kHz may be used. The beam shaping frequency settings for each direction may be set and configured independently from each other on a user interface.

Alternatively, or in addition to changing the beam shaping frequency as mentioned above, also the laser pulse frequency may be varied. The laser pulse frequency may be varied in between 0 and 5 kHz. Typically, laser pulse frequency is only used for specific applications, e.g., engraving, pulsed cutting (e.g., when piercing, curves, corners) so that energy input may be regulated by pulsing. In a certain aspect, changing the pulse frequency of the laser beam may be used to reduce the energy to be provided on the workpiece. The setting of the laser pulse frequency may be configured on a human machine or user interface, HMI. The HMI may provide settings for configuration of the beam shaping frequency for each direction separately and in addition for configuration of the laser pulse frequency, in a combined form or in a separate manner.

The cutting plan is a digital representation of the parts to be cut out of the workpiece and a movement direction and the control instructions for executing the cutting plan, for instance the sequence which defines what part of the cutting plan is to be cut next and/or what segment within one contour is to be cut next. The cutting plan, typically, is represented in a digital file format, like for example in an XML-based format.

The shape storage may be implemented as memory structure or as a database. This shape storage is configured for storing different dynamic laser beam shapes. The dynamic laser beam shapes may for example comprise different Lissajous figures. Alternatively, or in addition also other patterns and/or shapes may be stored and accessed.

Automatically calculating for a particular cutting segment, an allocation to a particular dynamic laser beam shape means automatically allocating a dynamic laser beam shape to a particular type of segment. Preferably, determining or calculating the allocation may be executed algorithmically by means of applying an allocation algorithm. In a simple form, the allocation algorithm may be implemented as a look-up table in a predefined data structure with pre-calculated allocations between a particular dynamic laser beam shape and physical properties, selected form the list, consisting of type of material, thickness of material, laser power, feed rate of the particular segment and objectives (like e.g., performance, quality, burr height, roughness, robustness etc.). For example, a setting of physical properties with material type M, thickness T, laser power P are associated with the dynamic laser beam shape S.

Alternatively or in addition, the allocation algorithm accesses a rule-base for a particular segment for looking-up the respective associated dynamic laser beam shape. In the rule-base a set of rules are stored. The rule-base may be implemented in or may be executed by accessing the shape storage. For example, the rules may represent to following settings: for cutting with a wider kerf width a (solely) transversal oscillation perpendicular to the cutting direction is appropriate. E.g., for increasing the cutting speed, a (solely) longitudinal oscillation in the cutting direction is best suited. Thus, a set of configurable rules are provided in the rule-base. By applying these rules, the allocation algorithm is configured to determine the allocation.

Alternatively or in addition, the allocation algorithm may be configured such as the mapping or allocation of a specific dynamic laser beam shape to a certain (workpiece contour) segment considers also the preceding and/or the subsequent segment and/or its dynamic laser beam shapes, respectively. This helps to improve cutting quality in order to provide smooth transitions between the shapes of two consecutive segments.

In a more complex embodiment, the allocation algorithm may be based on a trained neural network, which has been trained to find the best dynamic laser beam shape for each type of segment as described above.

Control instructions serve to control the laser cutting machine by applying the determined segment-specific dynamic laser beam shapes.

The control unit and/or the processor is/are an electronic module or may be a software module, implemented in a hardware module with a processor or may be a hardware module (as described below, e.g., FPGA; ASIC). In the context of the invention, a "processor" may be understood to mean, for example, a machine or an electronic circuit. In particular, a processor may be a central processing unit (CPU), a microprocessor or a microcontroller, for example, an application-specific integrated circuit or a digital signal processor, possibly in combination with a memory unit for storing program instructions, etc. A processor may also be, for example, an IC (integrated circuit), in particular an FPGA (field programmable gate array) or an ASIC (application-specific integrated circuit), or e.g., a multi-chip module, e.g., a 2.5D or 3D multi-chip module, in which in particular several so-called dies are connected to one another directly or via an interposer, or a DSP (Digital Signal Processor) or a GPU (Graphic Processing Unit). A processor can also be a virtualized processor, a virtual machine or a soft CPU. It can also be, for example, a programmable processor which is equipped with configuration steps for carrying out the said method according to the invention or is configured with configuration steps in such a way that the programmable processor implements the features according to the invention of the method, the component, the modules, or other aspects and/or partial aspects of the invention, like a FPGA or ASIC. The allocation tool and/or the transition tool may be part of a controller for controlling the laser cutting machine or may be a separate module, which is in data connection with the controller.

The order, according to which the steps of the method of the present invention are described in the present specification, does not necessarily reflect the chronological order, according to which said steps are carried out. For example, the steps of providing an allocation tool and providing a transition tool may be executed in another sequence.

The properties, features and advantages of this invention described above, as well as the manner they are achieved, become clearer and more understandable in the light of the following description and embodiments, which will be described in more detail in the context of the drawings. This following description does not limit the invention on the contained embodiments. Same components or parts can be labeled with the same reference signs in different figures. In general, the figures are not for scale.

SHORT DESCRIPTION OF THE FIGURES

DETAILED DESCRIPTION OF THE DRAWINGS AND FURTHER EMBODIMENTS

Figure 1:
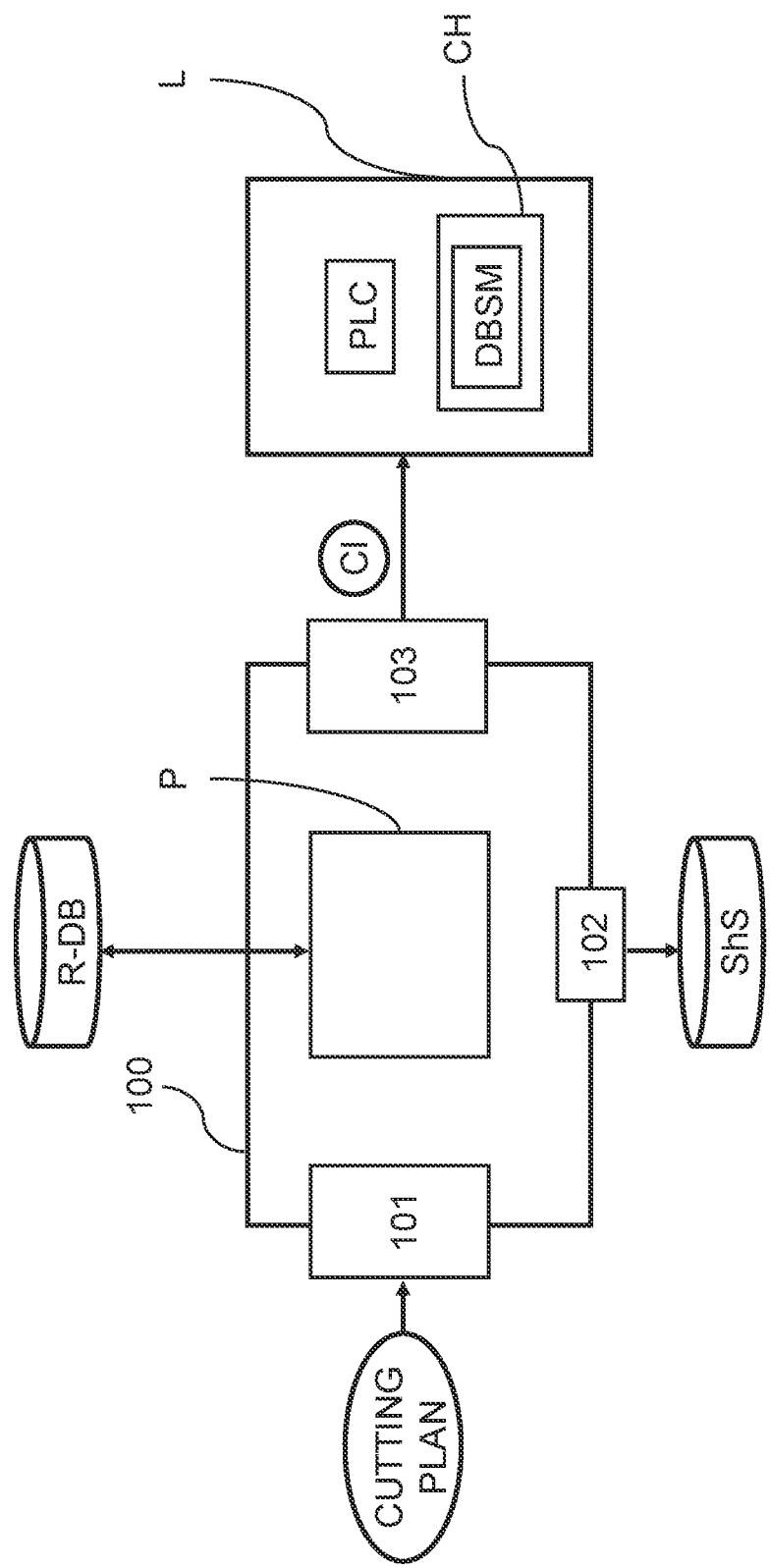
FIG. 1 is a schematic representation of a control unit for determining a dynamic laser beam shape for a set of cutting segment types.

FIG. 1 shows a schematic representation of a control unit 100 which is configured for executing the method for determining a dynamic laser beam shape for laser cutting by means of a laser cutting machine L.

The laser machine L has a cutting head CH, which may comprise at least one optical module. The optical module may be implemented as a dynamic laser beam shaping module DBSM or as another type of optical module for varying the shape of the laser beam dynamically. Further, the laser is equipped with the controller PLC. The control unit 100 may be provided as separate entity being in data exchange with the laser cutting machine L and in particular with the controller PLC of the same. Alternatively, or in addition, the control unit 100 may be implemented directly on the controller PLC of the laser cutting machine L.

The control unit 100 comprises a cutting plan interface 101 which is configured for receiving a cutting plan to be processed on the laser cutting machine L for cutting out parts of a workpiece. Each part is defined by a cutting contour according to the cutting plan. The cutting contour itself is segmented or subdivided in a set of different types of cutting segments, for example a straight-line segment, a curve segment with the first radius and another curve segment with a second radius, a corner segment, a lead-in the segment, etc. Generally, as the part is to be cut-out off the workpiece, the part shares the properties of the workpiece (before cutting, the part and the workpiece are not separated). The workpiece has properties. In particular, the workpiece is made of a certain type of material and has a certain type of thickness. Also, further properties may be processed. The properties are encoded by a property indicator. Thus, the type of material is encoded in the material indicator and/or the thickness is encoded in a thickness indicator.

The control unit 100 further comprises an interface 102, interfacing with the shape storage ShS. The shape storage ShS is configured for storing a set of different dynamic laser beam shapes, in particular more than two such different dynamic laser beam shapes.

The control unit 100 further comprises a processor P which is configured for automatically calculating for each of the cutting segments iteratively for all parts to be cut out of the workpiece an allocation to the particular dynamic laser beam shape of the set of dynamic laser beam shapes, stored in the shape storage ShS. Calculating the allocation is based on the property indicator of the related workpiece. The property indicator(s) may be derived from the cutting plan. Automatically calculating the allocation "type of cutting segment-selected dynamic laser beam shape" is executed specifically for each type of cutting segment. With other words, a first type of cutting segment (e.g., a straight-line segment) is allocated to a first dynamic laser beam shape and a second type of cutting segment (e.g., a corner segment) is allocated to a second dynamic laser beam shape and third type of cutting segment (e.g., a lead-in segment) is allocated again to the first dynamic laser beam shape and so on and so forth. The relation between the type of segment and the type of dynamic laser beam shape may be an n: m-relation. The allocation may be provided by executing an allocation algorithm. The allocation algorithm may access a rule database R-DB. The rule database is configured for storing rules for determining the relation between segment type and type of dynamic laser beam shape. Alternatively, or in addition, the allocation algorithm may apply a machine learning algorithm and/or a neural network.

The processor P is configured for providing control instructions CI on an output interface 103, which connects the control unit 100 with the laser cutting machine L. The provided control instructions CI are configured for controlling the laser cutting machine L for executing the received cutting plan by applying the determined dynamic laser beam shapes for each cutting segment or each type of cutting segment specifically.

The laser cutting machine is configured for processing/cutting materials and thicknesses for example as follows:
various steel alloys such as steel, mild steel, 0.8 mm-30 mm, thinner and thicker material may be cut as well;
Chrome steel (also known as Inox), 0.8 mm-30 mm, thinner and thicker material may be cut as well;
Aluminum, 0.8 mm-30 mm, thinner and thicker material may be cut as well;
Non-ferrous metals like copper, 0.8 mm-15 mm, or brass, 0.8 mm-15 mm, both also in thinner or thicker variants.
Material properties may comprise:
physical properties, inter alia comprising a material composition (Fe, C, Si, S, . . . ) may be provided via a material certificate, which may be encoded in a digital code (barcode, QR code) and provided with the workpiece or with the cutting plan;
melting temperature;

surface tension;
viscosity;
absorption coefficient;
heat capacity;
thermal conductivity;
density solid, density of melt;
actual temperature of metal sheet;
surface quality (roughness on the material);
crystal structure and/or
rolling direction.

Figure 2:
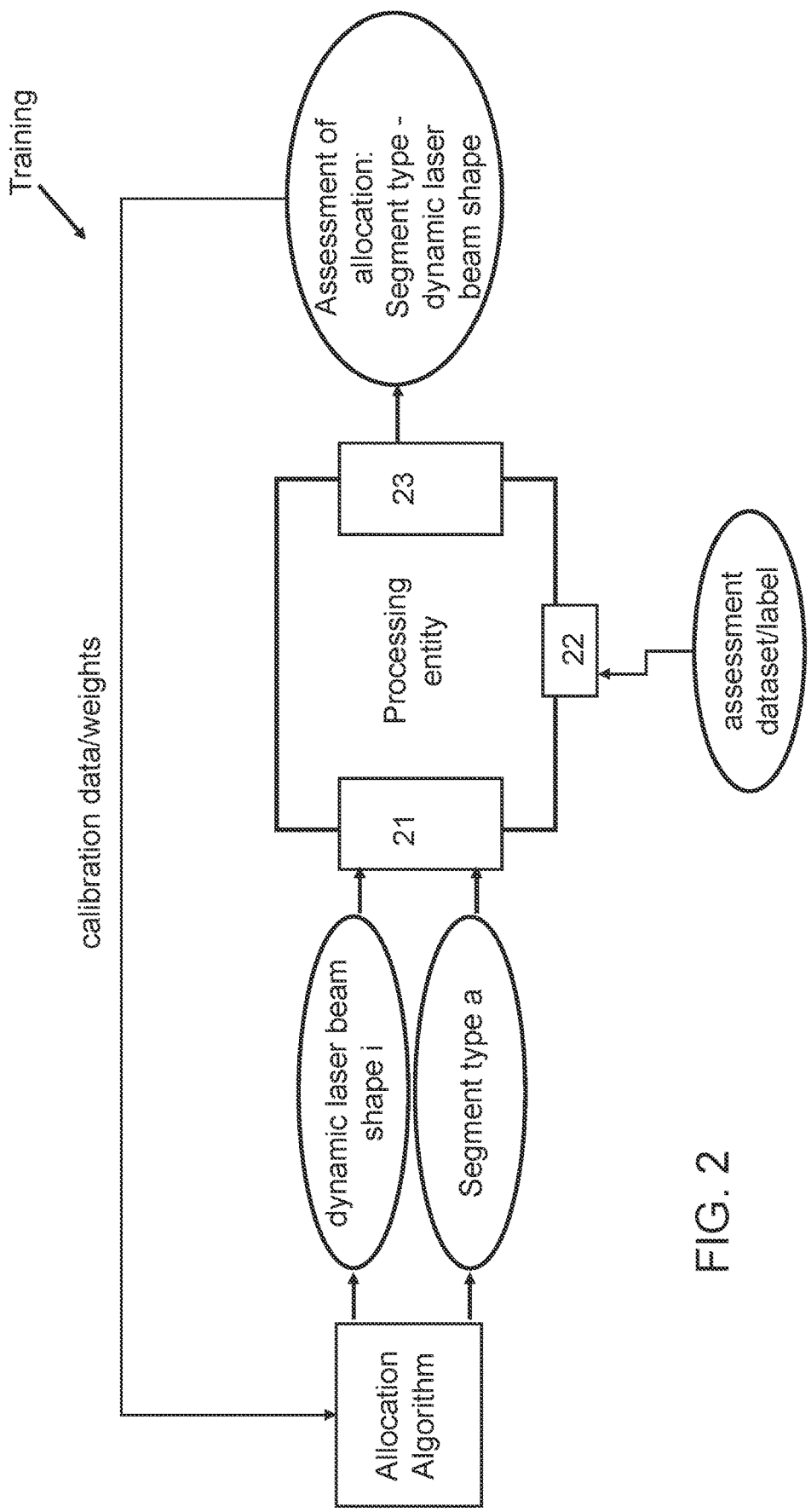
FIG. 2 is a schematic representation of a training algorithm for training allocations of dynamic laser beam shapes to a set of cutting segment types.

FIG. 2 shows a module or a method, respectively for training the allocation algorithm. As can be seen, the training is executed on a processing entity, which may be different from the processor and/or the control unit. Preferably, the processing entity on which the training is executed on is a separate unit. The processing entity comprises an input interface 21, which is configured for receiving a tuple, consisting of a particular dynamic laser beam shape i (represented by its indicators, like e.g., oscillation frequencies in various directions) and a particular type of segment a. Both, the dynamic laser beam shape and the type of segment are provided as result dataset of the allocation algorithm. With other words, the allocation algorithm has matched the dynamic laser beam shape i to the type of segment a. The result of the allocation algorithm is forwarded via the output interface 23 to the processing entity. After having executed the cutting of the particular segment with the determined particular dynamic laser beam shape, which has been allocated by the allocation algorithm, an assessment of the cutting result is executed. The assessment may e.g., be a quality assessment. The assessment is encoded in an assessment dataset. The assessment dataset is provided to the processing entity by means of the input interface 22. The processing entity is configured for evaluating the assessment dataset and optionally for comparing it with reference assessment datasets for providing an assessment of the allocation by means of output interface 23. The assessment of the allocation relates to the received particular dynamic laser beam shape i and the received particular segment a. A training data set and/or weights may be fed back to the allocation algorithm in order to calibrate and/or train the same. Generally, allocations between dynamic laser beam shapes and segment types will be rewarded if they have a positive assessment of the allocation and otherwise will be penalized if they have a negative assessment of the allocation.

Figure 3:
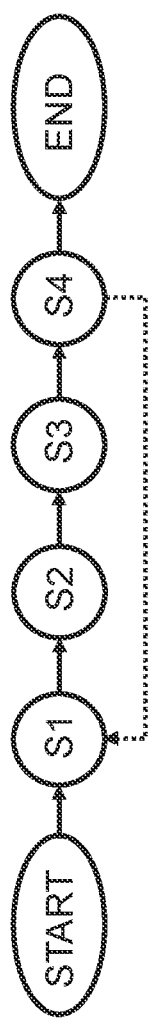
FIG. 3 is a flow chart of a method for determining a dynamic laser beam shape for each segment of a cutting contour according to a preferred embodiment of the present invention.

FIG. 3 is a flow chart of a method for determining a segment-specific dynamic laser beam shape for laser cutting contour according to a cutting plan according to a preferred embodiment of the present invention.

After start of the method, in step S1, a cutting plan is received. The cutting plan encodes contours of parts which are to be cut out of a workpiece. The cutting plan further includes workpiece properties, indicating the type of material and/or the thickness of the material. The properties of the workpiece are identical to the properties of the parts to be cut out of the workpiece.

In step S2, the shape storage ShS is accessed with the cutting segment of the set of cutting segments, received with the cutting plan in the preceding step. In this shape storage ShS a set of dynamic laser beam shapes is stored, particularly more than two and preferably an amount of dynamic laser beam shapes. Generally, frequency and/or amplitude in X/Y/Z direction can in principle be selected arbitrarily within the adjustment ranges. The amount may be above three at minimum for pierce-in, Curve segment, Straight-Line segment and until several hundred or a thousand dynamic laser beam shapes and in particular, in the range between 3 and 100.

Step S3 relates to automatically calculating for each of the cutting segments iteratively for all parts to be cut out of the workpiece an allocation to a dynamic laser beam shape of the set of dynamic laser beam shapes, accessed in the shape storage ShS. Calculating the allocation, S3, is based on the property indicator of the workpiece. Calculating the allocation is specific for the respective type of cutting segment.

Step S4 relates to providing control instructions CI for controlling the laser cutting machine L for executing the received cutting plan by applying the determined dynamic laser beam shapes for each cutting segment specifically. After this, the method may be reiterated or may end.

Figure 4:
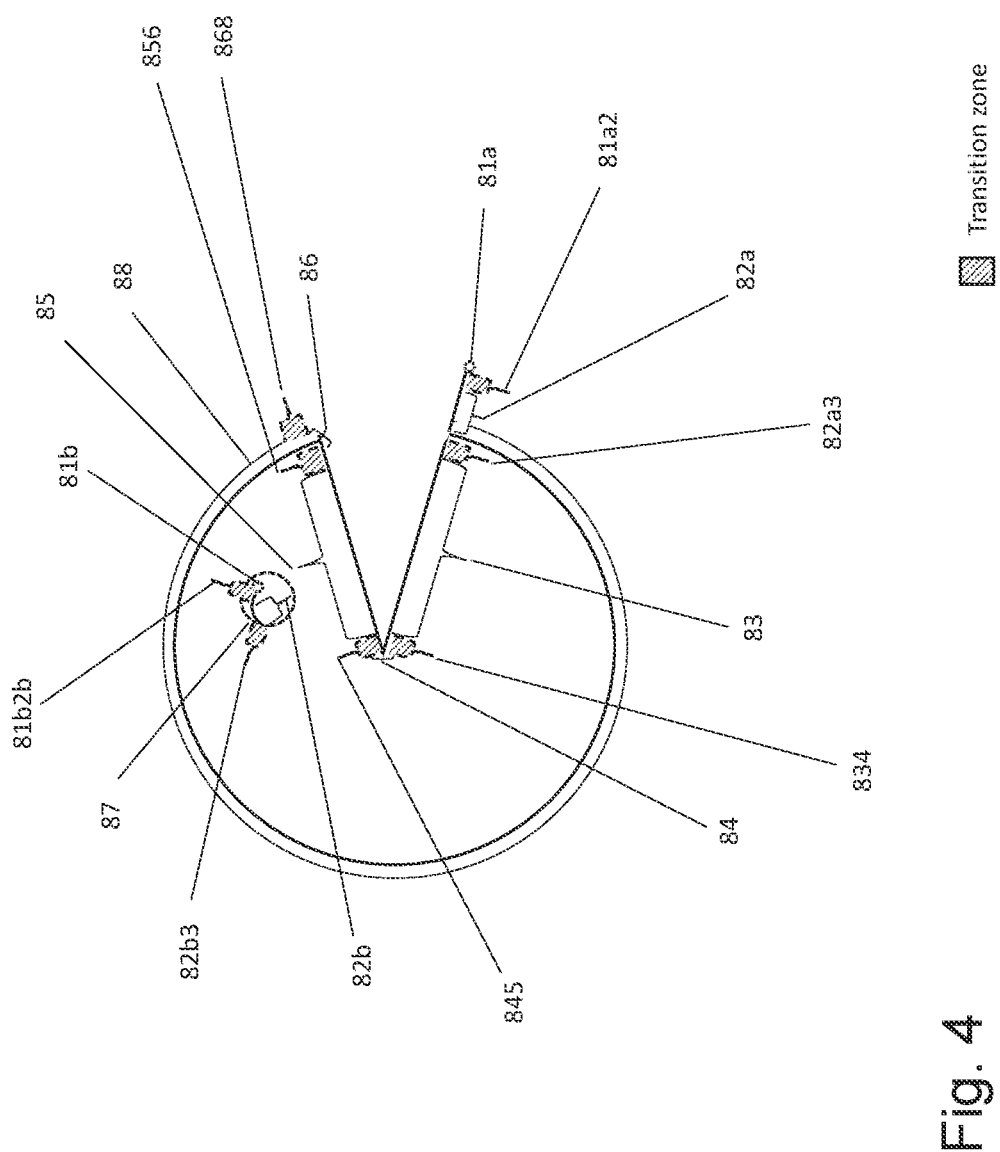
FIG. 4 is an example of a cutting contour with different types of segments.

FIG. 4 is an example of a cutting contour with different types of segments. As can be seen in the example, shown in FIG. 4, the cutting contour comprises a part of a circle element with one circle cut-out and a small circle cutting segment above the cut-out and in the upper right portion of the circle cutting contour. The transition zones and segments are depicted in FIG. 4 by a left hatched pattern.

Reference numeral 81a (on the right-hand side of FIG. 4) depicts a "pierce in" cutting segment for the outer circle cutting contour. Reference numeral 81a2 represents the dynamic laser beam shaping transition zone from segment 81a to segment 82a. The latter segment 82a represents a "lead in straight" cutting segment. Reference numeral 82a3 depicts that dynamic laser beam shaping transition zone between segment 82a to segment 83. The latter segment 83 represents "straight-line" cutting segment, there the laser cutting head may be moved quicker compared to corner segments. Reference numeral 834 represents the dynamic laser beam shaping transition zone or phase between segment 83 and segment 84. The segment 84 is "right turn corner" cutting segment. Reference numeral 845 represents the dynamic laser beam shaping transition zone or phase between segment 84 and segment 85. Segment 85 refers to another straight-line cutting segment. Reference numeral 856 represents a dynamic laser beam shaping transition zone or phase between segment 85 and segment 86. Segment 86 represents a "left turn corner" cutting segment.

As can be seen in FIG. 4 the contour further comprises another circle cutting segment, represented in FIG. 4 by reference numeral 87. This circle contour has a "pierce in" cutting segment, represented in FIG. 4 with reference 81b. The dynamic laser beam shaping transition zone between segment 81b and segment 82b is represented in FIG. 4 with the reference numeral 81b2b.

Figure 5:
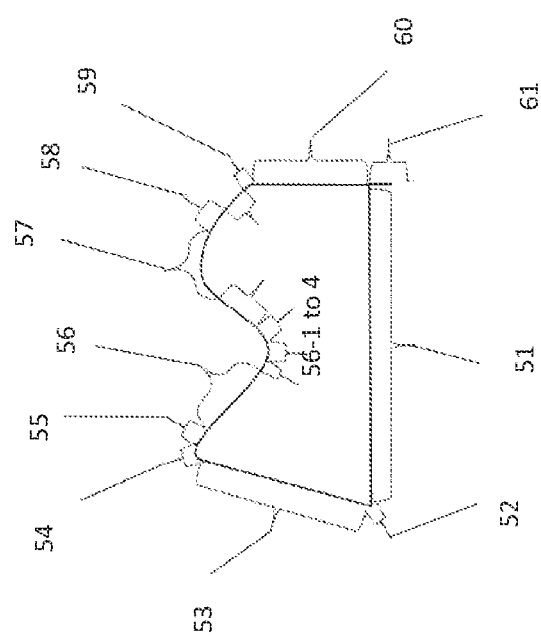
FIG. 5 is another example of a cutting contour with its segments.

FIG. 5 is another example of a cutting contour with different types of segments. In this example, the contour comprises a straight-line segment 51. Proceeding in a clockwise manner, the next segment in the contour is segment 52, which is a corner segment. Then, segment 53 is again another straight-line segment, followed by corner segment 54, followed by another corner segment 55, having another radius. Segment 56 is a straight-line segment, followed by a sequence of corner or radii segments, which are represented in FIG. 5 with reference numeral 56-1, 56-2, 56-3 and 56-4. As can be seen in the Figure, the radii are varying between the different 56-segments. After these radii segments 56-1 to 56-4, a segment 57 is provided, followed by different radii segments 58, 59, followed again by a straight-line segment 60. Subsequently, the laser cutting head H has to move on to corner segment 61 for closing the closed contour structure again.

Wherever not already described explicitly, individual embodiments, or their individual aspects and features, described in relation to the drawings can be combined or exchanged with one another without limiting or widening the scope of the described invention, whenever such a combination or exchange is meaningful and in the sense of this invention. Advantages which are described with respect to a particular embodiment of present invention or with respect to a particular figure are, wherever applicable, also advantages of other embodiments of the present invention.

The invention claimed is:

1. A computer-implemented method for determining a dynamic laser beam shape for laser cutting by means of a laser cutting machine, comprising at least one optical module for varying the shape of the laser beam dynamically, the method comprising:
   receiving a cutting plan to be processed for cutting out parts of a workpiece, wherein each part is defined by a cutting contour, including of a set of cutting segments, wherein each workpiece is characterized by a property indicator, selected from a group consisting of a material indicator and/or a thickness indicator;
   providing a shape storage, wherein the shape storage is configured for storing a set of dynamic laser beam shapes;
   accessing, by a processor, the shape storage and automatically allocating a dynamic laser beam shape from the set of dynamic laser beam shapes to each of the cutting segments iteratively for all parts to be cut out of the workpiece wherein different dynamic laser beam shapes are allocated to different types of the cutting segments and wherein a type of each of the cutting segments is selected from a group, comprising: a straight line; a circle or circle segments with a configurable particular radius; a corner with a configurable angle; a parameterized curve; a pierce-in; a lead-in; a lead-out; and/or an engraving and wherein the dynamic laser beam shapes are allocated to the cutting segments based on the property indicator of the workpiece and is specific for the respective cutting segment;
   providing, by the processor, control instructions on an output interface for controlling the laser cutting machine for executing the received cutting plan by applying the determined dynamic laser beams shapes for each cutting segment specifically.

2. The method according to claim 1, wherein automatically allocating a dynamic laser beam shape from the set of dynamic laser beam shapes to each of the cutting segments is executed by a trained neural network model, which provides for a specific type of segment as input, and a specific dynamic laser beam shape as output.

3. The method according to claim 2, wherein the neural network model is trained with training data, including:
   a selected dynamic laser beam shape used for a test cut;
   the property indicator of the workpiece which was test cut;
   a type of cutting segment, which was test cut; and
   a selected dynamic laser beam shape for the test cut segment with an assessment dataset, serving as annotated data label.

4. The method according to claim 3, wherein the assessment dataset comprises setting a configurable share of different assessment criteria in common, comprising a quality assessment, a requirement assessment, a performance assessment, an energy consumption assessment, a process stability assessment, a burr height assessment, a roughness assessment, a feed rate assessment, a kerf width assessment, a gas consumption assessment, a contour error assessment, an inclination angle/rectangularity assessment, a flatness cut edge assessment, a heat affected zone assessment and/or wherein the different assessment criteria have interdependencies which are tuned on a user interface selection button, provided on a human machine interface (HMI).

5. The method according to claim 2, wherein the neural network model, the neural network model including weights, is trained by executing:
   preselecting a dynamic laser beam shape of the set of dynamic laser beam shapes;
   executing cutting segment-specific test cuts with the preselected dynamic laser beam shape;
   executing an assessment of a result of the test cuts by providing assessment datasets for each test cut; and
   tuning the weights of the neural network model such that an objective function for the assessment dataset is optimized.

6. The method according to claim 3, wherein the assessment dataset is provided manually using a user interface and/or automatically by a sensory automatic assessment unit.

7. The method according to claim 1, wherein the automatically determined dynamic laser beam shapes for each of the cutting segments are determined specifically for a type of cutting machine.

8. The method according to claim 1, wherein in the set of dynamic laser beam shapes the dynamic laser beam shape is dynamically varied by generating focal point oscillation shapes through spatiotemporal distribution of laser energy over a material surface and/or a focal plane with respect to:
   a frequency in X and Y and Z direction;
   an amplitude in X and Y and Z direction; and/or
   a phase shift in in Y and Z compared to X direction.

9. The method according to claim 1, wherein a transition zone is determined by a linear, non-linear and/or a logarithmic and/or other transition function.

10. The method according to claim 1, wherein the dynamic laser beam shapes are implemented as Lissajous shapes.

11. The method according to claim 1, wherein the method comprises:
   receiving cutting requirements via a user interface, selected from the group consisting of burr height, roughness, feed-rate, kerf width, energy consumption, gas consumption, process stability, contour error, inclination angle/rectangularity, flatness of cutting edge, and/or heat affected zone;
   wherein the control instructions are generated by taking into account the received cutting requirements.

12. The method according to claim 1, wherein the laser beam shapes are determined based on user input data.

13. The method according to claim 1, wherein each of the dynamic laser beam shapes comprises a geometrical dataset, indicating a geometrical form and a time-related dataset, and indicating how the geometrical form has to be executed.

* * * * *